United States Patent

[11] 3,563,399

| [72] | Inventor | Charles C. Shivers |
| | | Corydon, Iowa 50060 |
| [21] | Appl. No. | 638,257 |
| [22] | Filed | May 15, 1967 |
| [45] | Patented | Feb. 16, 1971 |

[54] METHOD FOR CIRCULATING GRAIN STORED IN A CIRCULAR BIN
3 Claims, 8 Drawing Figs.

[52] U.S. Cl. ................................................ 214/152,
   34/102, 214/17, 259/97
[51] Int. Cl. ................................................ B65g 65/46
[50] Field of Search ................................................ 214/17.82,
   17.84, 17.6, 17.64, 152; 259/5, 97; 34/102

[56] References Cited
UNITED STATES PATENTS

| 1,454,610 | 5/1923 | Wolf | (259/97)UX |
| 3,123,234 | 3/1964 | Bjerkan | 214/17(.64) |
| 3,143,336 | 8/1964 | Byberg | 259/97 |
| 3,403,795 | 10/1968 | Schaefer | 214/17 |
| 3,487,961 | 1/1970 | Neuenschwander | 214/17(.82) |

*Primary Examiner*—Robert G. Sheridan
*Attorney*—Rudolph L. Lowell

ABSTRACT: A sweep auger radially mounted within a storage bin is rotatable horizontally across the bin floor about a vertical axis located centrally of the bin. An upright distributing auger arranged coaxially with the vertical axis has its lower end adjacent the inner end of the sweep auger and its upper end spaced from the roof of the bin. The sweep auger is of a construction such that for each complete revolution across the bin floor it moves predetermined volumes of material over given axial sections thereof for delivery to the distributing auger. The material or grain discharged from the distributing auger is spread across the top surface of the grain stored in the bin. All of the grain in the bin is thus acted upon continuously for circulation through the bin for drying purposes. Field grain may be introduced through the roof of the bin for concurrent distribution and circulation with the grain already in the bin. A bin unloading auger is located below the bin floor to receive grain directly from the sweep auger for discharge exteriorly of the bin.

INVENTOR
CHARLES C. SHIVVERS
BY
Rudolph L. Lowell
ATTORNEY

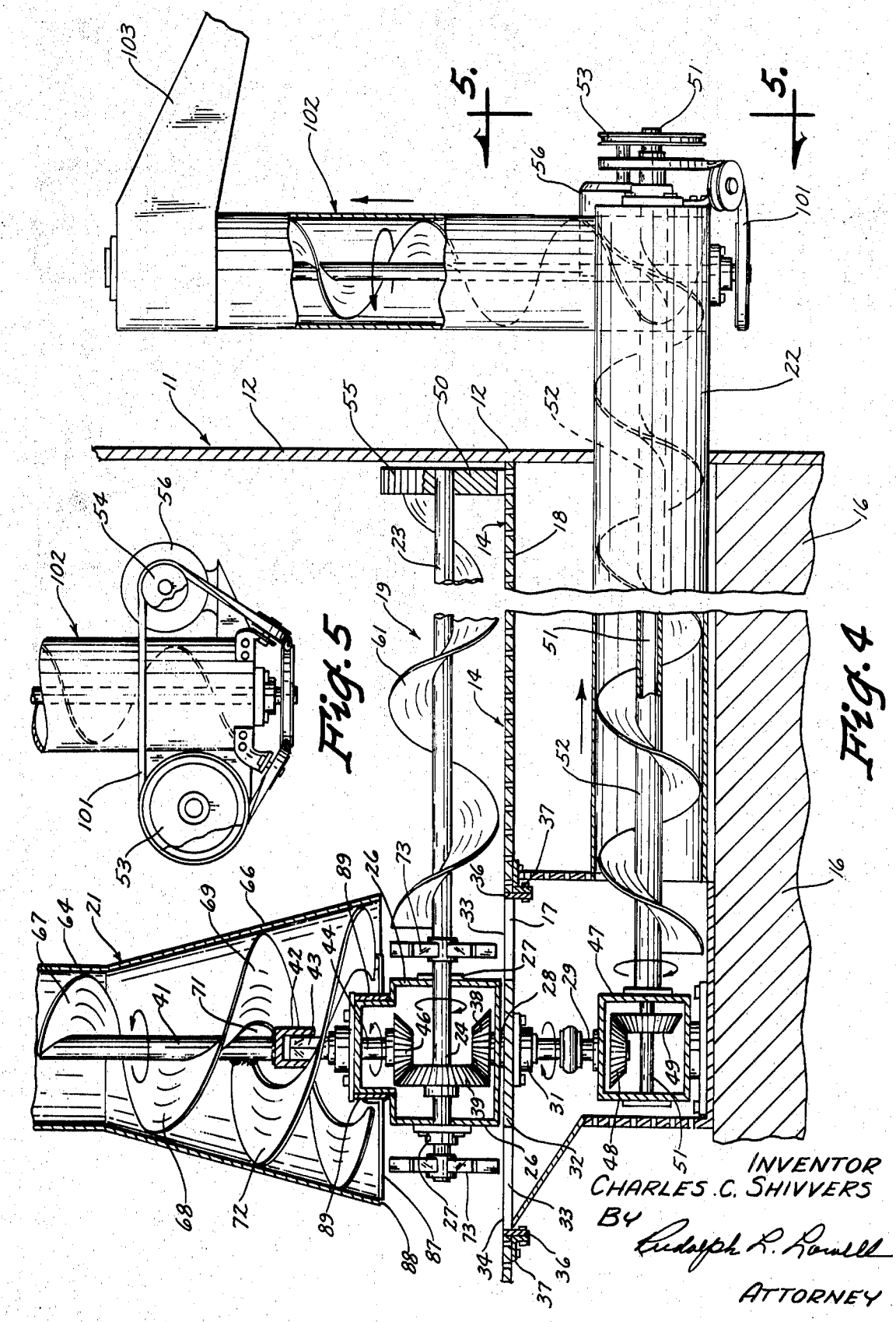

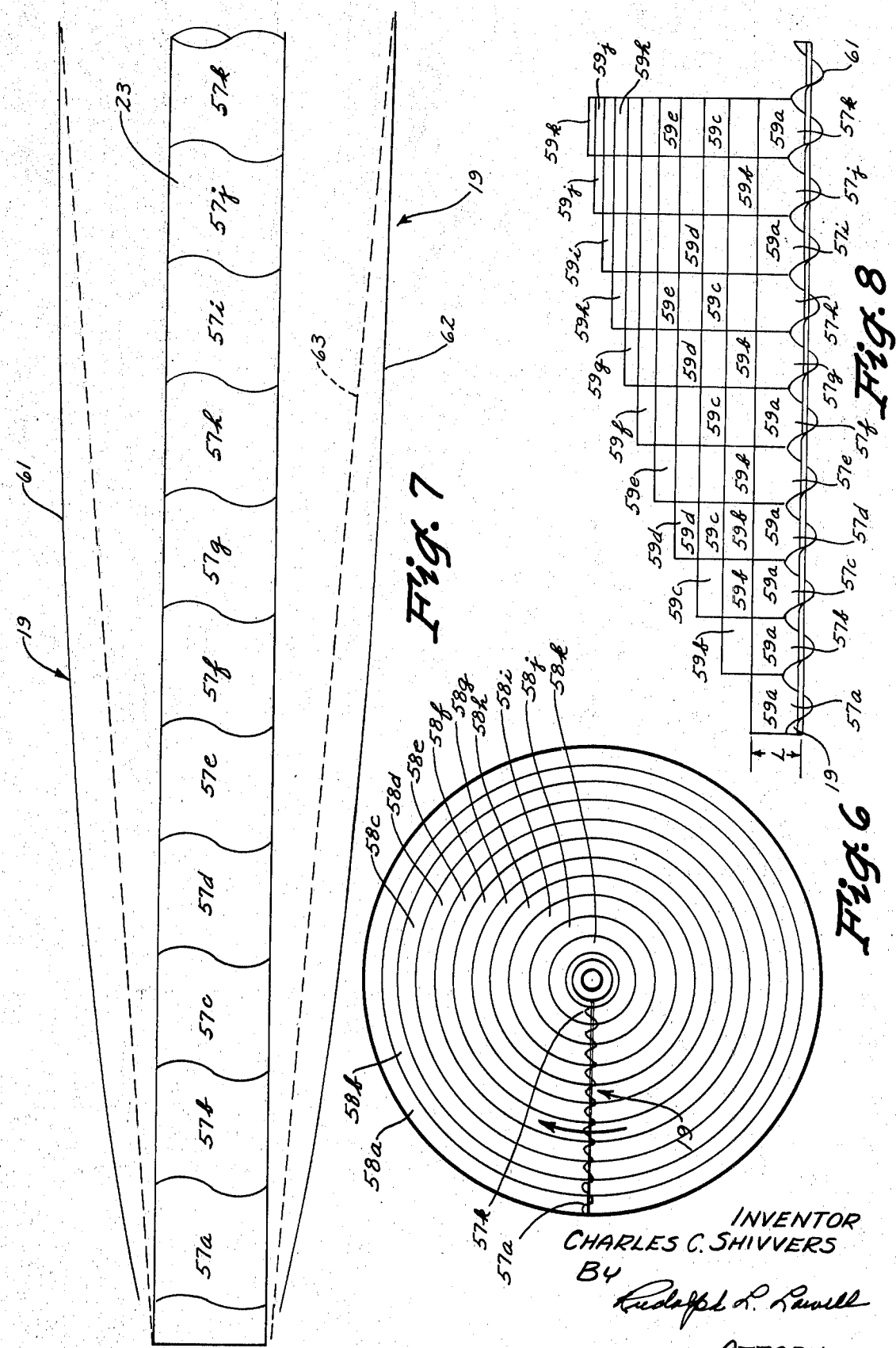

METHOD FOR CIRCULATING GRAIN STORED IN A CIRCULAR BIN

BACKGROUND OF THE INVENTION

Apparatus now in general use for bin-drying stored grain usually consists in first loading the bin and then supplying heated air through a ventilated bin floor for upward flow through the grain. In some instances, and for the purpose of facilitating the flow of air through the grain, a perforated tube at the center of the bin is extended upwardly through the grain, and the sidewall of the bin may be of a perforated construction.

The drying of grain in this manner is generally unsatisfactory since the moisture content, after drying, varies appreciably throughout the different levels of the stored grain. For example corn having a 15 percent moisture content is desirable. After drying, as above described, the moisture content of the corn frequently varies from a dry 8 or 9 percent corn at the bottom of the bin, to a wet 20 to 25 percent corn at the center of the stored grain, and with the top corn being about 17 percent.

Corn that is either too wet or too dry does not have the sales or feed value of corn that has a desired moisture content. Such corn, therefore, not only represents a direct financial loss to the farmer, but is subject to additional loss by the occurrence of spoilage during a usual grain storing period. It is also apparent that the initial drying operation is not only inefficient, but is also costly due to the extended drying period or time required.

SUMMARY OF THE INVENTION

The invention provides an apparatus for continuously circulating and blending all portions of grain stored in a bin to obtain a uniform moisture content whereby to eliminate overdrying or underdrying and consequent spoilage by crusting or molding. By mixing and circulating the grain in the bin concurrently with grain supplied to the bin all of the grain in the bin is dried uniformly, continuously and quickly so as to appreciably lower the cost and labor usually encountered in bin-loading and drying operations. The apparatus may be operated at infrequent intervals, after the grain in the bin has been initially dried, to maintain a desired moisture content in the grain. For unloading the grain an auger located beneath the bin floor is adapted to receive grain directly from the sweep auger for removal to the outside of the bin.

DETAILED DESCRIPTION OF THE INVENTION

Further objects and features of the invention will become apparent from the following description when taken in connection with the accompanying drawings, wherein:

FIG. 4 is an enlarged foreshortened sectional view showing the assembly relation of the sweep auger, unloading auger and the lower portion of the upright distributing auger and the power transmission system therefor;

FIG. 5 is an end elevational view of the unloading auger as seen on the line 5-5 in FIG. 4;

FIG. 6 is a diagrammatic illustration of the circular bin floor showing its division into concentric sections that are covered by corresponding axial sections of the sweep auger during one complete horizontal revolution thereof;

FIG. 7 is an illustration of the sweep auger axially reduced in length to more clearly show its construction; and FIG. 8 is a chart illustrating the volume of the sweep auger over axial sections thereof relative to their corresponding concentric sections shown in FIG. 6.

Figure 1:
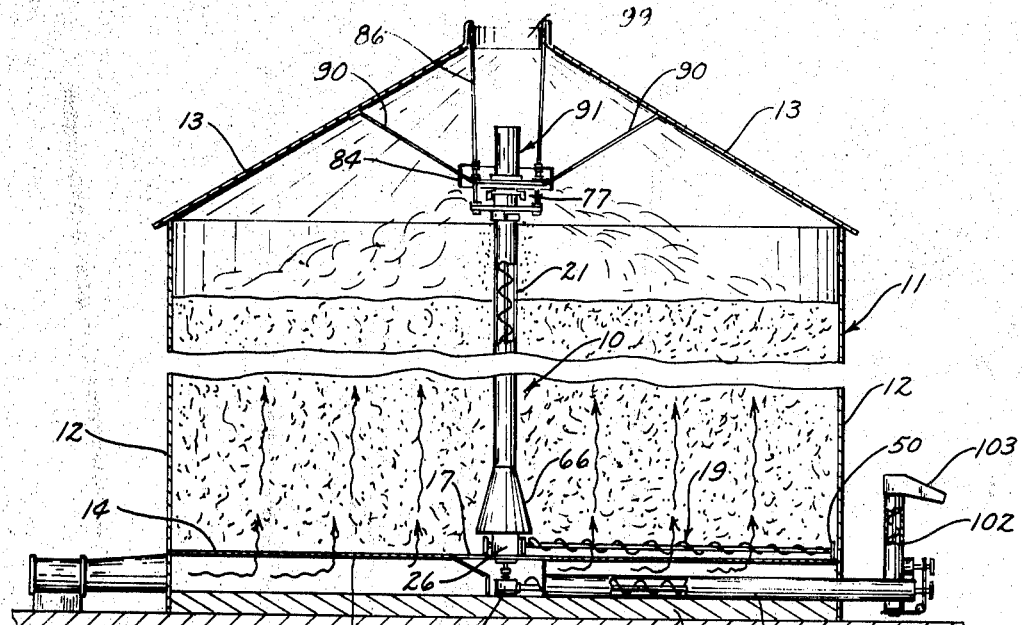
FIG. 1 is a side elevational view of the grain circulating apparatus of this invention shown in assembly relation with a circular storage bin.

With reference to the drawings, the grain circulating apparatus of this invention, indicated generally as 10, is shown in FIG. 1 with a circular grain storage bin 11 having a sidewall 12, a roof structure 13, and a false bottom wall or floor 14 spaced above a bin foundation 16. The floor 14 is formed with a central opening 17 and is perforated, as indicated at 18, to provide for ventilation upwardly therethrough of either atmospheric or heated air.

A radially extended sweep auger 19 is rotatably mounted within the bin 11 immediately adjacent to the floor 14 and is adapted to be rotated about its own axis and also to travel angularly over the floor in a horizontal plane to remove, during each horizontal revolution thereof, a predetermined volume of grain.

The grain removed by the sweep auger 19 is delivered to an upright distributing auger 21 which functions to distribute the grain received from the sweep auger 19 over the top surface of the grain stored in the bin 11. The stored grain is thus continuously recirculated throughout the bin for uniform drying and moisture content.

When the stored grain is to be unloaded from the bin 11, it is delivered by the sweep auger 19 through the central opening 17 to a radially extended unloading auger 22 mounted on the foundation 16 beneath the bin floor 14 and operable to move the grain exteriorly of the bin.

As shown in FIG. 4, the sweep auger 19 includes a shaft 23 the inner end section 24 of which is extended through a gear housing 26 for rotatable support in bearings 27. The housing 26 is rotatably carried at 28 on a depending vertical drive shaft 29 that is rotatably mounted in a bearing 31 secured to a center plate 32 which forms part of an open frame 33 fitted within the central opening 17 in the bin floor 14. The center plate 32 is integrally formed with radially extended arms 34 the outer ends of which are connected to a peripheral ring 36 that is secured to a supporting shoulder or ledge 37 extended about the sidewall of the central floor opening 17.

The upper end of the drive shaft 29, within the gear housing 26, has a bevel gear 38 that is in continuous meshed engagement with a bevel gear 39 carried on the inner section 24 of the sweep auger shaft 23. The upright distributing auger 21 includes a shaft 41 (FIG. 4) the lower end of which is provided with a socket 42 for receiving in mating engagement a male section 43 formed at the top of an upright stub shaft 44 rotatably supported in the housing 26 in coaxial alignment with the drive shaft 29. Carried on the lower end of the stub shaft 44, and within the gear housing 26, is a bevel gear 46 that is in meshed engagement with the bevel gear 39.

As thus far described it is seen that the sweep auger 19 is horizontally rotatable about a vertical axis that is located centrally of the bin 11 and coaxial with the drive shaft 29 and stub shaft 44.

The lower end of the drive shaft 29 is rotatably supported on a gear housing 47 mounted on the bin foundation 16 below the central floor opening 17. A bevel gear 48 mounted on the drive shaft 29, within the gear housing 47, is in continuous meshed engagement with a bevel gear 49 carried at the inner end of an idler shaft 51. This idler shaft is rotatably extended through a tubular shaft 52 which constitutes the auger shaft for the unloading auger 22.

Both the idler shaft 51 and the tubular auger shaft 52 have their outer ends projected outwardly of the bin 11 with the outer end of the idler shaft 51 extended from the outer end of the tubular shaft 52. A pulley 53 mounted on the portion of the idler shaft 51 extended from the auger shaft 52 is adapted for belt connection with a double pulley 54 (FIG. 5) carried on the shaft of a drive motor 56. It is seen therefor that the drive shaft 29 is driven from the idler shaft 51, to drive the sweep auger shaft 23 through the gears 38 and 39, and the distributing auger shaft 41 through the gears 38, 39 and 46. By virtue of the idler shaft 51 being rotatable within the auger shaft 52, the unloading auger 22 remains idle.

It is to be further noted that the sweep auger 19, concurrently with rotation about its own axis, namely the axis of the shaft 23, is rotated or walked horizontally across the bin floor 14 about the axes of the shafts 29 and 44 by a floor engaging wheel 50, mounted at the outer end of the shaft 23 for rotation therewith. The outer peripheral surface 55 of the wheel 50 is notched or spurred. This tractive effort of the wheel is complemented by the torque reaction effected by the bevel gear assembly within the housing 26.

As the sweep auger 19 is horizontally rotated, and as best shown in FIG. 6, predetermined axial sections of the auger 19, illustrated in FIG. 6 as being equal in length, sweep through corresponding concentric circular paths or sections of the bin floor 14. Thus, the outermost axial auger section, indicated at 57a, travels over a corresponding concentric section 58a, the mean diameter of which is many times greater than the mean diameter of the concentric section 58 k corresponding to the innermost axial section 57k of the sweep auger 19. It is apparent therefor that for each horizontal revolution of the sweep auger 19, each axial section of the sweep auger moves a predetermined volume of grain and with the outermost axial section 57a handling the largest volume or quantity of the grain.

Thus, to remove a predetermined volume of stored grain the entire area of and adjacent to the bin floor 14, the sweep auger 19 must be capable of transferring inwardly, from any given point along its length, all of the grain picked up by the auger portion extended outwardly from such point, plus the grain gathered by that portion of the auger extended inwardly from such point. In other words, any given axial section of the sweep auger 19 should have a grain carrying or volume that is sufficient to receive all of the grain being moved by the next adjacent axial section outwardly therefrom, plus a predetermined volume of the grain that is to be gathered and moved by the given axial section.

With reference to FIG. 8, the sweep auger 19 is diagrammatically illustrated as divided over its length into equal axial sections 57a—57k, inclusive. Let it be assumed that these axial sections, during horizontal rotation of the sweep auger across the bin floor 14, will travel over corresponding concentric sections illustrated in FIG. 6 and indicated as 58a—58k, inclusive to remove a bottom layer of the stored grain that is of a substantially equal height or thickness over the entire area of the bin floor 14. This uniform bottom layer of grain to be removed from the bin floor 14, on completion of one horizontal revolution of the sweep auger 19, is indicated at L in FIG. 8. The axial section 57a therefor has a capacity or volume equal to the area of the concentric section 58a multiplied by the thickness of the bottom layer L. This volume is indicated in FIG. 8 as 59a.

The next adjacent inner axial section 57b must have a volume or capacity equal to the volume 59a plus the volume, indicated at 59b, which is equal to the area of the concentric section 58b times the thickness of the bottom layer L. The overall volume or capacity of the axial section 57b is thus greater than the capacity of the axial section 57a by the volume amount indicated as 59b, which is seen to be less than the volume 59a.

As shown in FIG. 8 the axial section 57c has a volume capacity equal to that of the axial sections 57a and 57b, plus the volume indicated as 59c, which is equal to the area of the concentric section 58c times the thickness of the bottom layer L. Again it is to be noted that the volume 59c is less than the volume 59b which in turn is less than the volume 59a.

As illustrated in FIG. 8, the volume capacity of each axial section 57a—57k progressively increases with a correspondingly progressive decrease in the volumes 59a—59k.

To accommodate these volume variations over its axial length, the sweep auger 19 is constructed generally in accordance with the following formula:

$$X = \sqrt{\frac{R^2 D^2 - r^2 D^2 + r^2 S^2}{R^2}}$$

wherein R is the axial length of the sweep auger shaft 23; r is the axial length from the inner end of the auger shaft 23 to any given point outwardly therefrom; X is the diameter of the flighting 61 of the sweep auger 19 at the given point; D is the given diameter of the auger flighting 61 at the delivery or inner end of the sweep auger 19; and S is the diameter of the shaft 23.

Following this formula the diameter variations in the flighting 61 of the sweep auger 19 axially of the auger shaft 23 are relatively small. To better exemplify the results of the formula computations, therefore, the sweep auger 19 is illustrated in FIG. 7 with the diameter of the shaft 23 shown full scale, but with the length of the shaft drawn to a scale of 1 inch being equal to 1 foot and shown in foot sections corresponding to the axial sections 57a—57k. The diameter of the flighting 61 is drawn to full scale, namely, to the scale of the shaft diameter. The full line showing 62 indicates the contour defined by the auger flighting 61 and the dotted line showing 63 indicates the contour of a flighting, that is uniformly tapered between the same end dimensions provided for the flighting 61.

With the sweep auger 19 constructed in the manner above described, the thickness of the bottom layer L to be removed may be varied by merely varying the speed of rotation of the sweep auger 19 about its own axis or by varying such speed relative to the horizontal speed of rotation across the bin floor 14. It is to be understood that the grain moving characteristics of the sweep auger 19 may be varied to provide for the removal of a bottom layer of stored grain of different thickness over given axial lengths thereof to accomplish blending or mixing of the stored grain concurrently with circulation of the grain. However, whether a bottom layer of grain of equal thickness, or a bottom section of different thickness over given axial lengths of the auger, are to be removed, the sweep auger 19 should be constructed with a capacity to provide for the transfer inwardly from any given point along its length of all of the grain picked up by the auger length extended outwardly from the given point.

In this respect it is to be noted that to provide for a continuous circulation of the grain moved by the sweep auger 19, the capacity of the distributing auger 21 should be equal to or greater than the capacity of the sweep auger 19, and, importantly, the grain delivered by the sweep auger should be continuously moved into the distributing auger 21 without any excessive compression or tendency of the grain to back feed being effected by the auger 19.

Thus as shown in FIG. 4, the grain at the inner end of the sweep auger 19 is moved against and upwardly about the gear housing 26. The casing 64 of the upright auger 21 has an outwardly flared or bell-shaped lower section 66, that is arranged in a spaced relation about the top portion of the housing 26. The flighting 67 for the auger 21 has a lower portion 68 of a tapered construction and of a size and shape corresponding to the bell-shaped casing section 66. The lower end section 69 of the tapered flighting portion 68 is cut away as indicated at 71, so that the inner side of the section 69 is spaced in a downward direction progressively greater distances from the auger shaft 41.

A second lower flight section 72, corresponding in size and shape to the first bottom section 69, is secured to the shaft 41 in an opposed relation with the section 69 such that the upper portion of the gear housing 26 and the socket 42 are located within the space defined by the inner edges of the lower flight sections 69 and 72. The free ends of the lower sections 69 and 72 thus function as spiral scoops or ribbons for picking up the grain from about the housing 26 and moving it upwardly into the distributing auger 21.

As a result of the pickup action of the opposed flight sections 69 and 72, the grain is freely moved from the sweep auger 19 into the distributing auger 21, without any pressure buildup on the grain, by either the discharge action of the sweep auger 19, or the entering action of the distributing auger 21. Stated otherwise the lower ends of the spiral scoops or flight sections 69 and 72 freely dig into the grain about the housing 26, and with the grain not carried upwardly directly by the sections 69 and 72 being free to move upwardly about the shafts 41 and 42 between such sections.

To eliminate any excess accumulation of grain fines about the gear housing 26 and also to aid in the moving of what is commonly referred to as wet grain, a pair of lift paddles 73 are mounted on the inner end section 24 of the sweep auger shaft 23, to opposite sides of the housing 26 and within the peripheral confines of the flared end section 66 of the casing 64 for the distributing auger 21. The paddles 73 function to move grain adjacent the housing 26 upwardly into the path of movement of the flight sections 69 and 72 of the distributing auger 21.

Figure 3:
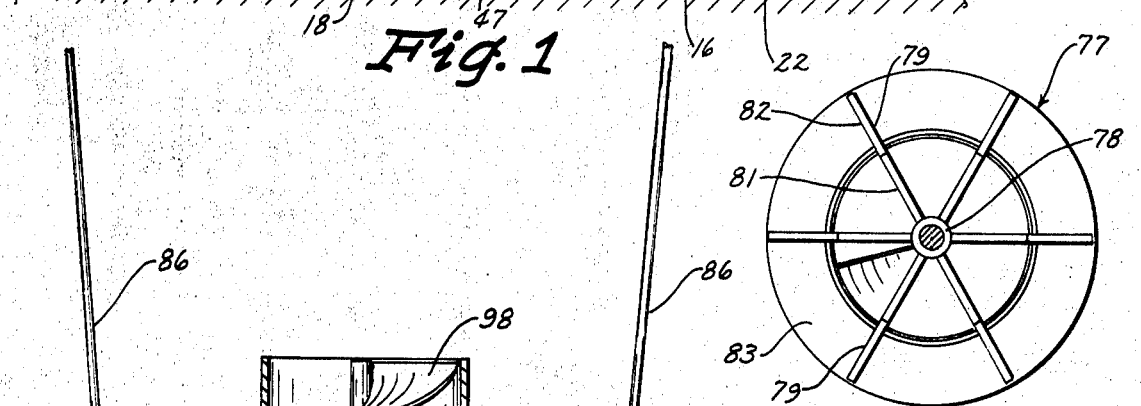
FIG. 3 is a sectional view taken along the line 3-3 in FIG. 2.
Figure 2:
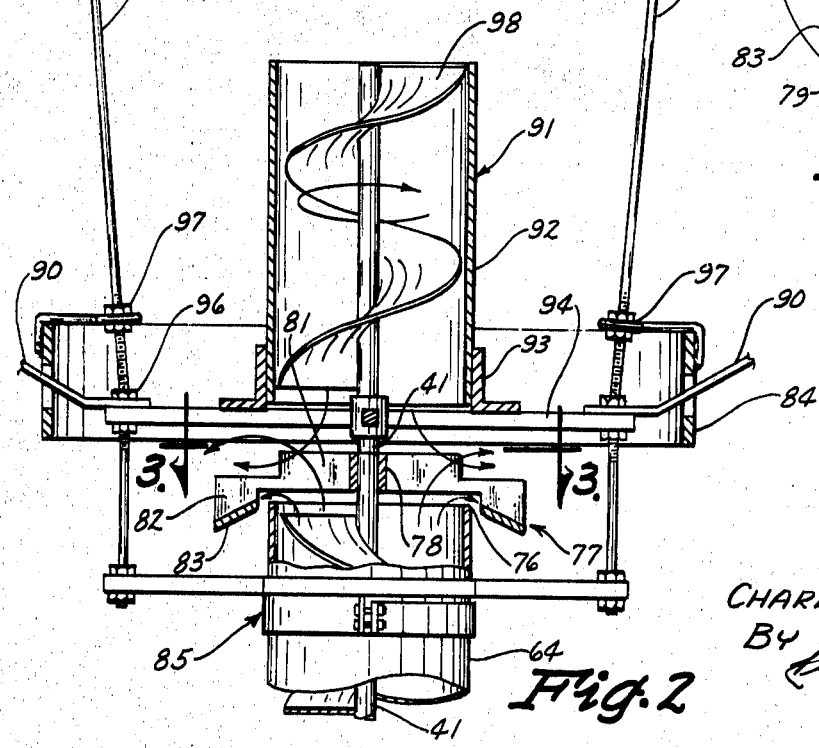
FIG. 2 is an enlarged sectional detail view of the top portion of an upright distributing auger shown in assembly relation with a feed auger which form part of the apparatus of this invention.

The grain moved upwardly within the distributing auger 21 is discharged from the upper end thereof for distribution over the top surface of the grain stored within the bin 11 (FIG. 2). Mounted about the shaft 41 and adjacent the upper peripheral edge 76 of the casing 64 is a rotating distributor member, indicated generally at 77. The distributor 77 (FIGS. 2 and 3) has a hub portion 78 formed with radially extended upright vanes 79 having inner sections 81 and outer sections 82. The inner sections 81 are located within the confines of the peripheral edge 76 of the casing 64 while the outer sections 82 project outwardly and downwardly from such peripheral edge. The lower sides of the outer vane sections 82 are interconnected by a continuous flat ring member 83 which is inclined downwardly and outwardly from the peripheral edge 76.

Grain moved upwardly within the casing 64 is thus acted upon by both of the vane sections 81 and 82, with the vane sections 82 acting primarily to distribute any grain fines to positions midway between the distributing auger 21 and the bin sidewall 12 so as to reduce their accumulation about the lower end of the distributing auger 21.

To further maintain a desired proportion of grain fines to grain kernels in the area surrounding the upright distributing auger 21 a deflector ring 84 is supported at a level above the distributor member 77 in a concentrically spaced relation therewith. Grain kernels thrown outwardly and upwardly by the vanes 79, on striking the deflector ring 84 are directed downwardly to fall about the distributing auger 21.

The auger casing 64 is supported from the bin roof structure 13 by a clamping ring assembly 85 secured adjacent the upper end of the casing 64 and suspended from the roof structure by hanger rods 86. The auger casing 64 is further supported at its lower end (FIG. 4) by the provision of radially extended supporting straps or ribs 87 connected to and extended inwardly from the bottom peripheral edge 88 of the flared casing section 66 for connection of their inner ends to a holding ring 89 that is rotatably mounted about the upper end of the gear casing 26.

A feed auger 91 (FIGS. 1 and 2) is arranged in a coaxially spaced relation above the distributing auger 21. The casing 92 of the feed auger 91 has a lower mounting flange 93 which is connected to and supported on a spider frame 94 that is secured to the hanger rods 86 as indicated at 96. It is to be noted that the deflector ring or shield 84 is adjustably supported on the hanger rods 86 as indicated at 97. The rods 86 are held against swinging movement by brace rods 90 connected between the rods 86 and the roof structure 13. The shaft 41 of the distributing auger 21 is projected upwardly and outwardly from the casing 64 and into the casing 92 with an auger flighting 98 being provided the shaft 41 within the axial length of the casing 92.

Grain supplied into the feed auger 91 through a delivery opening 99 formed in the roof structure 13 is carried downwardly by the auger 91 for discharge on to the distributor member 77. As a result the grain in the storage bin 11 may be circulated concurrently with the loading of the bin whereby to appreciably reduce the time period normally required for drying of the grain to reduce its moisture content for storage purposes. Stated otherwise the circulating and drying operations are carried on concurrently with the bin loading operation.

After the bin has been loaded and the grain properly dried to a desired moisture content the stored grain may be periodically circulated with only outside air being passed upwardly through the perforations 18 in the bin floor 14 in order to maintain the desired moisture content.

When the grain is to be removed from the bin 11, the connection of the idler shaft 51 with the operating motor 56 is maintained. Additionally, the tubular auger shaft 52 of the unloading auger 22 is connected to the double pulley 54 of the drive motor 56 through a belt and pulley system indicated generally at 101 in FIGS. 4 and 5. As illustrated, it is seen that the belt and pulley arrangement 101 provides for the operation of an upright delivery auger 102 from the auger shaft 52 of the unloading auger 22.

With the operating motor 56 thus connected to drive both the idler shaft 51 and the auger shaft 52 the sweep auger 19 and the distributing auger 21 are operated in all respects similar to their operation for grain circulating purposes. However, by virtue of the operation of the unloading auger 22 substantially all of the grain delivered to the inner end of the sweep auger 19 is dropped downwardly through the opening 17 for pickup at the inner end of the unloading auger 22. During this unloading operation therefor the sweep auger 19 functions to gather grain from the floor 14 and to deliver such grain inwardly into the central opening 17. As a result all of the grain in the bin 11 is completely removed without the usual requirement of manually pushing or moving the grain from about the floor 14 into the central opening 17.

The grain from the unloading auger 22 is transferred to the delivery auger 102 for discharge through the chute 103 into transport or grain mixing vehicles.

I claim:

1. The method for circulating free-flowing grain stored in a circular bin having a ventilated floor which comprises:
   a. continuously radially moving predetermined relative volumes of grain at a progressively increasing volume flow from given portions of grain extended annularly within the bin for delivery centrally of the bin to successively remove horizontal layers of grain of uniform thickness from the floor of the bin;
   b. elevating the centrally delivered grain above the surface of the stored grain; and
   c. distributing the elevated over the top surface of the stored grain so that the stored grain is continuously and uniformly circulated from the bin floor to the top surface of the stored grain.

2. The method for circulating free-flowing grain stored in a circular bin having a ventilated floor which comprises:
   a. progressively radially moving predetermined relative volumes of grain at a progressively increasing volume flow from given portions of grain extended annularly on the bin floor for delivery centrally of the bin to remove successive horizontal layers of grain of uniform thickness from the floor of the bin;
   b. concurrently moving said centrally delivered grain upwardly above the surface of the grain stored in the bin at the same rate that the grain is being progressively removed from the bottom of the bin; and
   c. distributing said upwardly moved grain over the top surface of said stored grain.

3. The method for successively removing layers of uniform thickness of free-flowing grain from the ventilated floor of a bin which comprises:
   a. continuously radially moving predetermined relative volumes of grain at a progressively increasing volume flow from given portions of grain extended annularly on the bin floor for delivery centrally of the bin; and
   b. continuously removing the centrally moved grain from the bin.

Disclaimer 3,563,399.—*Charles C. Shivers*, Corydon, Iowa. METHOD FOR CIRCULATING GRAIN STORED IN A CIRCULAR BIN. Patent dated Feb. 16, 1971. Disclaimer filed June 15, 1981, by the inventor.

Hereby enters this disclaimer to claim 3 of said patent.

[*Official Gazette September 28, 1982.*]

REEXAMINATION CERTIFICATE (550th)

United States Patent [19]

Shivers

[11] B1 3,563,399

[45] Certificate Issued Aug. 12, 1986

[54] METHOD FOR CIRCULATING GRAIN STORED IN A CIRCULAR BIN

[76] Inventor: Charles C. Shivers, Corydon, Iowa 50060

Reexamination Request:
No. 90/000,363, Apr. 27, 1983

Reexamination Certificate for:
Patent No.: 3,563,399
Issued: Feb. 16, 1971
Appl. No.: 638,257
Filed: May 15, 1967

Disclaimer of claim 3 filed: Jun. 15, 1981 (1022 O.G. 58)

[51] Int. Cl.⁴ .................................. B65G 65/46
[52] U.S. Cl. .............................. 414/786; 34/102; 366/147; 366/186; 366/266; 366/288; 366/292; 366/318; 414/287
[58] Field of Search ............... 414/287, 301, 310–312, 414/318–322, 786; 366/131; 198/661

[56] References Cited

U.S. PATENT DOCUMENTS

| | | |
|---|---|---|
| 767,762 | 8/1904 | McClelland . |
| 1,274,548 | 8/1918 | Holnagel . |
| 1,454,610 | 5/1923 | Wolf . |
| 1,475,361 | 11/1923 | Stogdale . |
| 1,704,731 | 3/1929 | Eggert . |
| 2,256,407 | 9/1941 | O'Brian . |
| 2,569,039 | 9/1951 | Berthelot . |
| 2,617,351 | 11/1952 | Graham . |
| 2,687,816 | 8/1954 | Messing . |
| 2,851,173 | 9/1958 | Morrison . |
| 2,969,156 | 1/1961 | Miller . |
| 2,970,827 | 2/1961 | Dodson . |
| 3,076,567 | 2/1963 | O'Dell . |
| 3,084,814 | 4/1963 | Schaefer . |
| 3,108,703 | 10/1963 | Horne . |
| 3,123,234 | 3/1964 | Bjerkan . |
| 3,127,032 | 3/1964 | Roberts . |
| 3,129,828 | 4/1964 | Lusk . |
| 3,134,491 | 5/1964 | Glenn . |
| 3,143,336 | 8/1964 | Byberg . |
| 3,309,782 | 3/1967 | Ellis . |
| 3,365,812 | 1/1968 | Borrow . |
| 3,403,795 | 10/1968 | Schaefer . |
| 3,414,142 | 12/1968 | Kolze . |
| 3,438,517 | 4/1969 | Steffen . |
| 3,487,961 | 1/1970 | Neuenschwander . |

OTHER PUBLICATIONS

1953 Link Belt Catalog–Book 2289.
1959 Link Belt Catalog–Book 2989.
1964 Link Belt Sales Manual.
Characteristics of a Tapered Screw Conveyor For Mixing Granular Materials, University of Georgia–1965 (Paper 65–340).
Characteristics of a Tapered Screw Conveyor For Mixing Granular Materials, Transactions of the ASAE–1965.
1965 Shivvers Document.

*Primary Examiner*—Robert J. Spar

[57] ABSTRACT

A sweep auger radially mounted within a storage bin is rotatable horizontally across the bin floor about a vertical axis located centrally of the bin. An upright distributing auger arranged coaxially with the vertical axis has its lower end adjacent the inner end of the sweep auger and its upper end spaced from the roof of the bin. The sweep auger is of a construction such that for each complete revolution across the bin floor it moves predetermined volumes of material over given axial sections thereof for delivery to the distributing auger. The material or grain discharged from the distributing auger is spread across the top surface of the grain stored in the bin. All of the grain in the bin is thus acted upon continuously for circulation through the bin for drying purposes. Field grain may be introduced through the roof of the bin for concurrent distribution and circulation with the grain already in the bin. A bin unloading auger is located below the bin floor to receive grain directly from the sweep auger for discharge exteriorly of the bin.

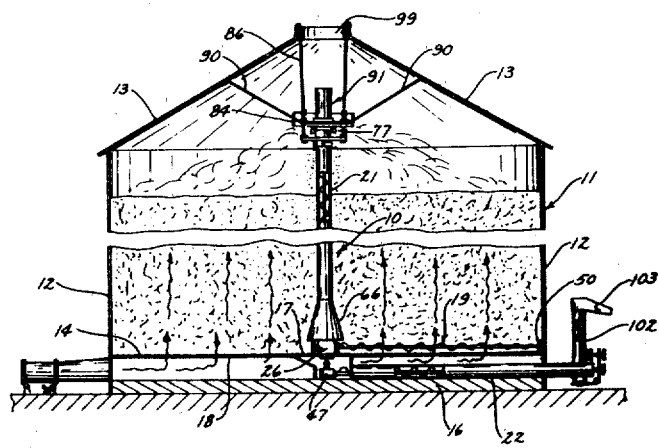

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

Claim 3 was previously disclaimed.

* * * * *